(No Model.)

R. B. BROWN.
PROCESS OF THE MANUFACTURE OF OIL FROM OLEAGINOUS SEED.

No. 285,220.  Patented Sept. 18, 1883.

Attest:
Charles Pickle
Wm. F. Sayers

Inventor:
Robert B. Brown
By Knight Bro.
Attys

UNITED STATES PATENT OFFICE.

ROBERT B. BROWN, OF ST. LOUIS, MISSOURI.

PROCESS OF THE MANUFACTURE OF OIL FROM OLEAGINOUS SEED.

SPECIFICATION forming part of Letters Patent No. 285,220, dated September 18, 1883.

Application filed May 10, 1883. (No model.)

*To all whom it may concern:*

Be it known that I, ROBERT B. BROWN, of the city of St. Louis, in the State of Missouri, have invented a certain new and useful Process of Manufacture of Oil from Oleaginous Seeds, of which the following is a full, clear, and exact description, reference being had to the accompanying drawings, which serve to illustrate the process and form part of this specification.

The novel feature of my process consists in forcing air into the body of crushed or ground seed or meal to dry or dry and heat the same preparatory to pressing.

Figure 1:
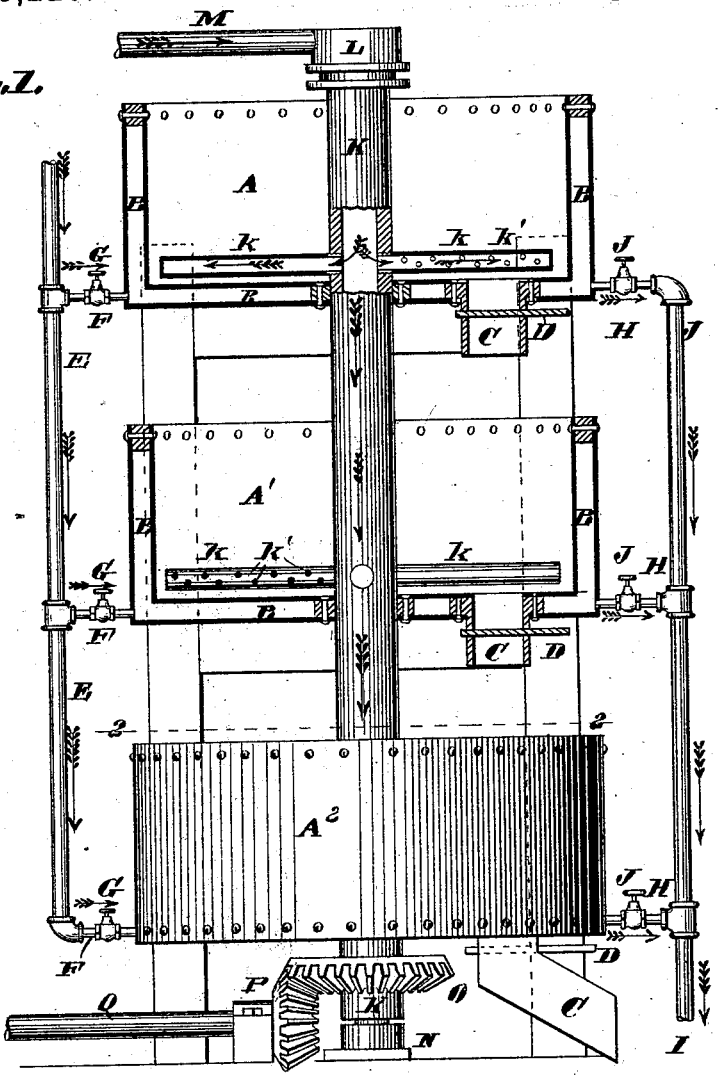
Figure 2:
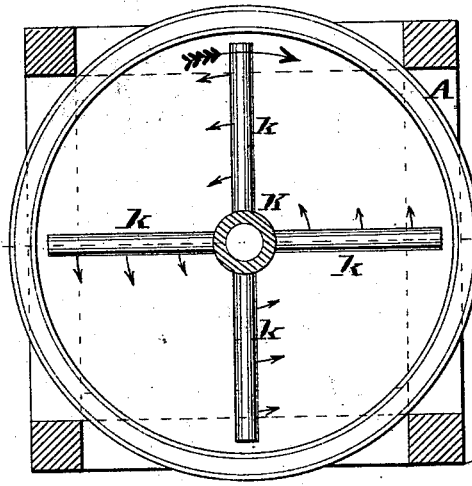

Figure 1 is a section at 1 1, Fig. 2, showing a machine suited for the treatment of the meal in the application of my process. Fig. 2 is a section at 2 2, Fig. 1.

To make clear the difference between the ordinary process and my new process in the manufacture of oil, I will describe both.

In the present manner of manufacturing cotton-seed oil, after separating the meat from the hull and other foreign matter, the meat is crushed by passing between rolls, and then placed in a heater consisting of a steam-jacketed tank or receiver, the steam-jacket extending around the sides and bottom. The purpose is to heat and dry the meal. I do not therefore claim, broadly, the subjecting of the crushed seed or meal to a drying process before the same passes into the percolator.

It is found in practical working of seed that it varies greatly in amount of moisture contained in the seeds or meats. So great is the moisture at times that it requires a long time to dry the meats sufficiently to put them into a fit condition for pressing. When the meat or meal is sufficiently dried, it is put into bags and the oil pressed out by hydraulic presses. The cakes produced are generally about seven pounds weight, and contain about fourteen per cent. of oil, being usually dark and uneven in color and texture, the moisture having caused the meats to form balls of various sizes. By my new process I have overcome the difficulties and so prepared the meat that it can be pressed without bags in a "plate-press," (so called,) making a cake of about double the usual weight, of even texture, and with a reduction in the cost of press-work of more than eighty cents per ton, and with an increase of more than six per cent. in the production of oil.

In carrying out my process in the preferred way I use an apparatus substantially as shown in the drawings, and which I will now describe.

A A' A² are three similar steam-jacketed receivers, in such positions that the meal from the upper one can be passed into the one below by opening the valve D, that closes the discharge spout or chute C. The lower receiver is shown as discharging through an inclined chute, C. The steam-jacket B extends around and beneath each receiver A, and is supplied with steam by a steam-pipe, E, having a branch, F, leading to each jacket B. G are stop-cocks in the branches F. The water of condensation escapes from the jackets B through branch pipes H and main pipe I.

J are stop-cocks in the branch pipes.

K is a tubular air-shaft turning with an air-tight joint at the upper end in a head, L, and receiving air at that point through a blast-pipe, M, leading from any suitable blower. The tubular shaft has tubular arms $k$ extending radially from it, said arms being stopped at the end, and having small holes, $k'$, at the rear side, through which the air escapes into the meal as the shaft K rotates. The shaft K is stepped at N.

O is a bevel cog-wheel upon the tubular shaft K, and P is a bevel cog-wheel on the drive-shaft Q, the tubular shaft having rotation imparted to it through these means.

In carrying out my process the meal from the crusher-rolls is placed in the receivers and the shaft K caused to rotate. The air passes down the shaft and out into the meal through the air-holes $k'$ in the arms $k$. The movement of the arms $k$ in the meal agitates it and causes the air to gain access to all parts of the mass, where it becomes loaded with moisture and carries it away with it from the meal. The air supplied to the stirring-arms $k$ may be cold or heated, the warm air giving the best and quickest results. The quantity of air furnished can be regulated by any suitable means.

The operation of drying or drying and heating may be completed in one receiver, and, in fact, a single receiver is all that is essential; but I generally prefer to partially complete the drying and heating process in one receiver, and to complete it in receiver or receivers beneath, into which the meal can be discharged from the receiver above.

When the drying or drying and heating is completed, the meal may be placed in an open cloth in a mold and the edges of the cloth folded up over the top and the oil discharged in a plate-press.

I claim—

1. In the process of the manufacture of oil from oleaginous seeds, the forcing of air into the body of the meal by means of the hollow revolving arms, substantially as set forth.

2. The described process in the manufacture of oil from oleaginous seeds—namely, the crushing of the meat, followed by forcing air through the crushed meat, and then subjecting it to pressure, for the purpose set forth.

ROBERT B. BROWN.

Witnesses:
SAML. KNIGHT,
GEO. H. KNIGHT.